United States Patent
Hsieh et al.

(10) Patent No.: US 11,579,795 B2
(45) Date of Patent: Feb. 14, 2023

(54) CONTROL METHOD FOR SOLID STATE DRIVE

(71) Applicant: SOLID STATE STORAGE TECHNOLOGY CORPORATION, Taipei (TW)

(72) Inventors: Shih-Hung Hsieh, Taipei (TW); Hsuan-Yi Chiang, Taipei (TW); Shi-Xuan Chen, Taipei (TW); Tzu-Chieh Lin, Taipei (TW)

(73) Assignee: SOLID STATE STORAGE TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 17/194,342

(22) Filed: Mar. 8, 2021

(65) Prior Publication Data
US 2022/0236906 A1    Jul. 28, 2022

(30) Foreign Application Priority Data
Jan. 27, 2021    (CN) .......................... 202110108700.2

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
USPC ........................................................ 711/154
See application file for complete search history.

(56) References Cited

U.S. PATENT DOCUMENTS

| | | | | |
|---|---|---|---|---|
| 8,479,080 B1* | 7/2013 | Shalvi | ................. | G06F 12/0246 714/766 |
| 10,096,357 B2* | 10/2018 | Lin | ........ | G11C 16/28 |
| 11,061,814 B1* | 7/2021 | O'Brien, III | ......... | G06F 3/0616 |
| 2011/0283049 A1* | 11/2011 | Kang | ..................... | G11C 16/16 711/170 |
| 2012/0246443 A1* | 9/2012 | Meir | ................... | G06F 11/1096 711/E12.078 |
| 2014/0240335 A1* | 8/2014 | Hu | ...................... | G06F 12/0802 345/543 |
| 2016/0092120 A1* | 3/2016 | Liu | ....................... | G06F 3/0629 711/103 |
| 2019/0243580 A1* | 8/2019 | Lee | .................... | G11C 11/4096 |
| 2019/0278703 A1* | 9/2019 | Kim | ...................... | G06F 3/0679 |
| 2021/0279170 A1* | 9/2021 | Liu | ..................... | G06F 12/0607 |

\* cited by examiner

*Primary Examiner* — Gautam Sain
*Assistant Examiner* — Elias Young Kim
(74) *Attorney, Agent, or Firm* — WPAT, PC

(57) ABSTRACT

A control method for a solid state drive is provided. The solid state drive includes a non-volatile memory with plural blocks. In a step (a1), a block is opened. In a step (a2), a program action is performed to store a valid write data into the open block. Then, a step (a3) is performed to judge whether an amount of the valid write data in the open block reaches a predetermined capacity. In a step (a4), if the amount of the valid write data in the open block does not reach the predetermined capacity, the step (a2) is performed again. In a step (a5), if the amount of the valid write data in the open block reaches the predetermined capacity, the open block is closed and the step (a1) is performed again. The predetermined capacity is lower than a capacity of one block.

4 Claims, 6 Drawing Sheets

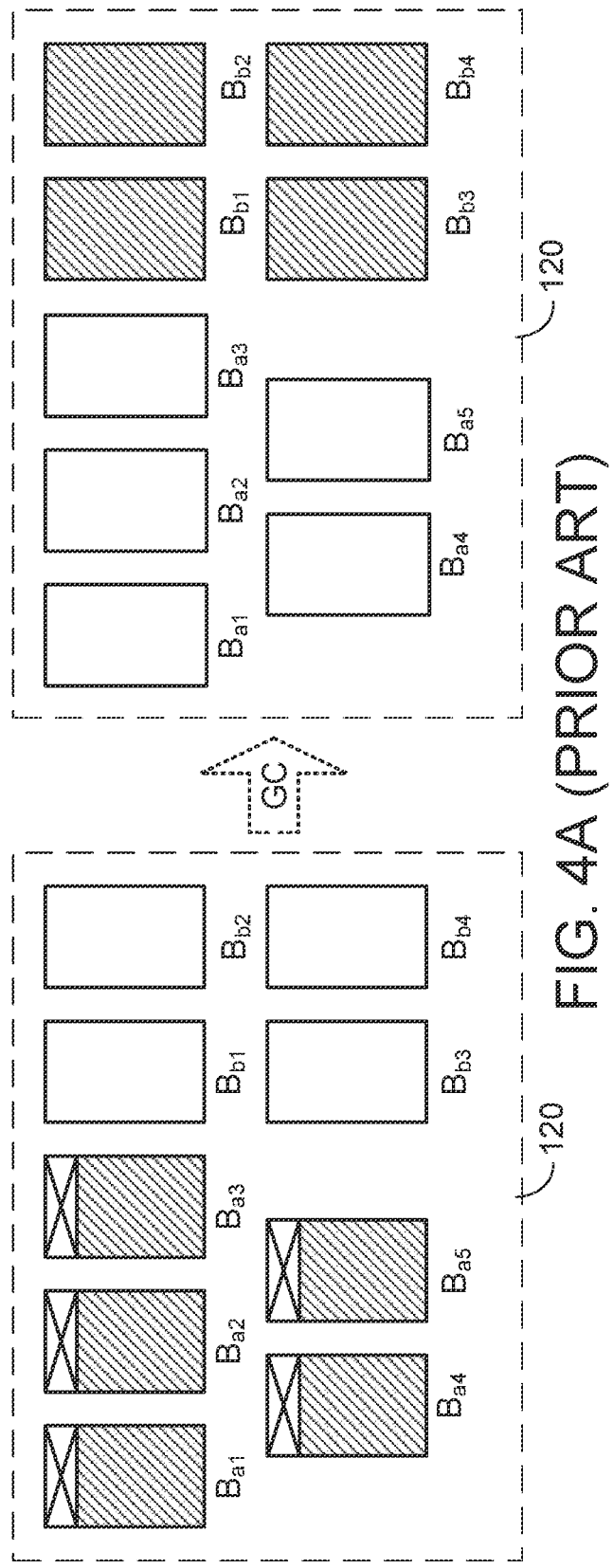
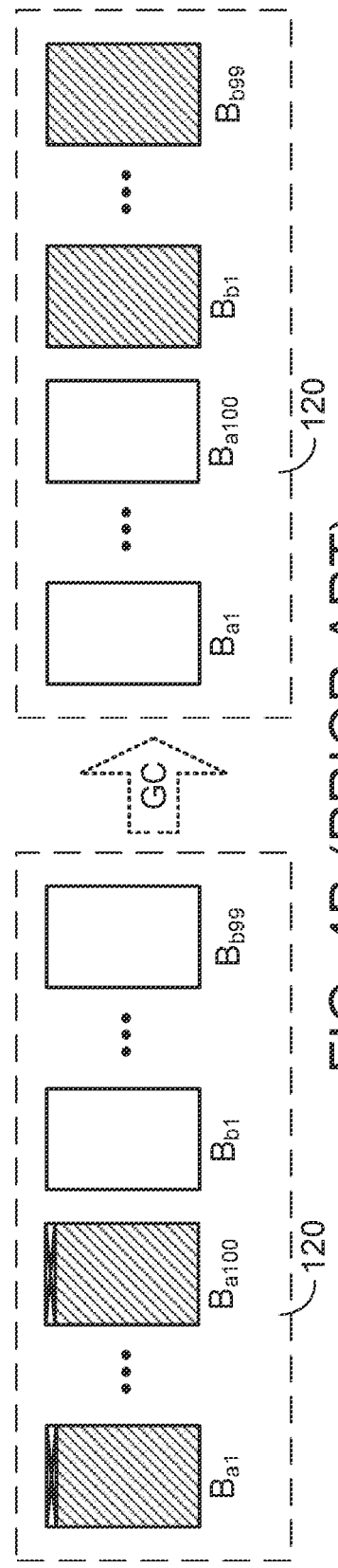
FIG. 4A (PRIOR ART)
FIG. 4B (PRIOR ART)

CONTROL METHOD FOR SOLID STATE DRIVE

This application claims the benefit of People's Republic of China Patent Application No. 202110108700.2, filed Jan. 27, 2021, the subject matter of which is incorporated herein by reference.

FIELD OF THE INVENTION

The present invention relates to an operating method for a storage device, and more particularly to a control method for a solid state drive.

BACKGROUND OF THE INVENTION

As is well known, a solid state drive (SSD) is a data storage device that uses a non-volatile memory to store data. After data are written to the non-volatile memory, the data are still retained in the solid state drive even if no electric power is supplied to the non-volatile memory.

FIG. 1 is a schematic functional block diagram illustrating the architecture of a conventional solid state drive. As shown in FIG. 1, the solid state drive 10 comprises a controller 110, a buffering element 130 and a non-volatile memory 120. The controller 110 is in communication with a host 12 through an external bus 20. Consequently, commands and data can be exchanged between the controller 110 and the host 12. For example, the buffering element 130 is a cache memory, and the non-volatile memory 120 is a flash memory. For example, the buffering element 130 is a static random access memory (SRAM) or a dynamic random access memory (DRAM). For example, the external bus 20 is a USB bus, an IEEE 1394 bus, a M.2 bus, a PCIe bus or a SATA bus.

The non-volatile memory 120 comprises a main storage area 122 and an over-provisioning area (OP area) 124. Generally, the host 12 is only able to access the data of the main storage area 122. The data for the controller 110 to implement specified functions are stored in the OP area 124. For example, the OP area 124 contains backup blocks to replace the bad blocks of the main storage area 122. Optionally, the controller 110 may use the blocks of the OP area 124 to implement a garbage collection (GC) action.

A process of storing write data from the host 12 into the main storage area 122 of the non-volatile memory 120 will be illustrated as follows. Firstly, the controller 110 performs an error correction code (ECC) encoding operation on the write data, and then temporarily stores the write data into the buffering element 130. Moreover, the controller 110 performs a program action at proper time in order to store the write data of the buffering element 130 into the main storage area 122 of the non-volatile memory 120.

FIG. 2 schematically illustrates the structure of a four-channel non-volatile memory. The non-volatile memory 120 comprises four channels CH1~CH4. Each channel contains 1024 blocks. The write data can be written into the open blocks of the four channels CH1~CH4. The open block is the block associated with the program action.

The first blocks of the four channels CH1~CH4 are the block $B_0$, the block $B_1$, the block $B_2$ and the block $B_3$, respectively. The second blocks of the four channels CH1~CH4 are the block $B_4$, the block $B_5$, the block $B_6$ and the block $B_7$, respectively. The rest may be deduced by analogy.

Similarly, the (n+1)-th blocks of the four channels CH1~CH4 are the block $B_{4n}$, the block $B_{4n+1}$, the block $B_{4n+2}$ and the block $B_{4n+3}$, respectively, wherein n is an integer larger than or equal to 0 and smaller than or equal to 1023. In other words, the 1023th blocks of the four channels CH1~CH4 are the block $B_{4092}$, the block $B_{4093}$, the block $B_{4094}$ and the block $B_{4095}$, respectively.

The non-volatile memory 120 comprises the main storage area 122 and the OP area 124. A portion of each of the channels CH1~CH4 is included in the main storage area 122 so as to be accessed by the host 12. The other portion of each of the channels CH1~CH4 is included in the OP area 124 and is controlled by the controller 110.

Generally, each of the channels CH1~CH4 in the non-volatile memory 120 comprises plural blocks. Each block contains plural pages. For example, each channel of the non-volatile memory 120 contains 1024 blocks, each block contains 64 pages, and each page has the size of 4k bytes. Due to the inherent properties of the non-volatile memory 120, at least one page is written during the program action, and the erase action is performed in a block-wise fashion.

It is noted that the number of the channels in the non-volatile memory 120 and the number of the blocks in each channel are not restricted. Moreover, the number of pages in each block and the size of each page may be determined by the manufacturer of the non-volatile memory 120. That is, the number of pages in each block is not restricted to 64, and the size of each page is not restricted to 4k bytes.

In a normal working state, the host 12 accesses the non-volatile memory 120 through logical block addresses (LBA). Each LBA can store data of 512 bytes in size. That is, the LBA size is 512 bytes, and the data amount that can be stored in each block is equal to 500 LBA sizes, i.e., 64×4k bytes=256k bytes=500×512 bytes.

When the host 12 intends to program the write data into the main storage area 122 of the non-volatile memory 120, the host 12 may provide a write command and a corresponding LBA to the controller 110. Then, the corresponding LBA write data is transmitted from the host 12 to the controller 110. The LBA write data is temporarily stored in the buffering element 130 by the controller 110. Then, the LBA write data is transmitted to and stored into the main storage area 122 of the non-volatile memory 120. The data amount of the LBA write data is equal to the LBA size, i.e., 512 bytes. Of course, the host 12 may issue consecutive LBAs and transmit plural LBA write data to the controller 110. For brevity, the LBA and the corresponding LBA write data will be described as follows.

FIGS. 3A to 3D schematically illustrate the operations of the non-volatile memory of the conventional solid state drive when a program action is performed by the controller. When the program action is performed by the controller 110, the LBA write data are sequentially stored into the blocks according to the serial numbers of the blocks. For example, after the LBA write data is filled into the block $B_0$, the controller 110 closes the block $B_0$ and continuously writes the LBA write data into block $B_1$. The rest may be deduced by analogy.

As shown in FIG. 3A, the box marked with oblique lines denotes a valid LBA write data. The blocks $B_0$, $B_1$, $B_2$ and $B_3$ have been filled with plural LBA write data. In addition, the controller 110 continuously stores the LBA write data into the block $B_4$. For example, the LBA write data corresponding to $LBA_z$ is stored in the block $B_1$, the LBA write data corresponding to $LBA_y$ is stored in the block $B_2$, and the LBA write data corresponding to $LBA_x$ is stored in the block $B_3$.

Moreover, the host 12 can update the stored LBA write data. When the host 12 updates the LBA write data corresponding to a specified LBA, the updated LBA write data is stored in the block that is being used. At the same time, the previously stored LBA write data corresponding to the specified LBA is set as an invalid LBA write data. The host 12 is unable to read the invalid LBA write data.

Please refer to FIG. 3B. When the host 12 updates the LBA write data corresponding to $LBA_x$, the updated LBA write data is stored in the block that is being used (i.e., the block $B_4$). At the same time, the LBA write data previously stored in the block $B_3$ corresponding to $LBA_x$ is set as an invalid LBA write data. In the drawings, the block with the cross mark denotes the invalid LBA write data.

As shown in FIG. 3C, the block $B_4$ has been filled with plural LBA write data. In addition, the controller 110 continuously stores the LBA write data into the block $B_5$. When the host 12 updates the LBA write data corresponding to $LBA_y$ and $LBA_z$, the two updated LBA write data are stored in the block that is being used (i.e., the block $B_5$). At the same time, the LBA write data previously stored in the block $B_2$ corresponding to $LBA_y$ and the LBA write data previously stored in the block $B_1$ corresponding to $LBA_z$ are set as the invalid LBA write data.

As shown in FIG. 3D, the block $B_5$ has been filled with plural LBA write data. In addition, the controller 110 continuously stores the LBA write data into the block $B_6$. When the host 12 updates the LBA write data corresponding to $LBA_x$, the updated LBA write data is stored in the block that is being used (i.e., the block $B_6$). At the same time, the LBA write data previously stored in the block $B_4$ corresponding to $LBA_x$ is set as the invalid LBA write data.

After the controller 110 performs plural program actions, the number of the blank blocks in the non-volatile memory 120 is gradually decreased. That is, the programmable space of the non-volatile memory 120 will be gradually decreased. Moreover, since the LBA write data are continuously updated by the host 12, many invalid LBA write data are contained in the used blocks.

As mentioned above, the erase action of the non-volatile memory 120 is performed in the block-wise fashion. Although some blocks of the non-volatile memory 120 contain invalid LBA write data, these blocks also contain valid LBA write data. In other words, these blocks cannot be directly erased by the controller 110.

In case that there are not enough blank blocks in the non-volatile memory 120, the controller 110 of the solid state drive 10 will perform the garbage collection action in order to release the space for the invalid LBA write data in the used blocks. Consequently, the programmable space is increased. The principles of the garbage collection action will be described as follows.

When the controller 110 performs the garbage collection action, the controller 110 checks the valid data rates of all blocks sequentially. For example, if the valid data rate of a block is 100%, it means that the data stored in this block are all valid LBA write data. Whereas, if the valid data rate of a block is 90%, it means that 10% of the data stored in this block are invalid LBA write data and 90% of the data stored in this block are valid LBA write data. Whereas, if the valid data rate of a block is 80%, it means that 20% of the data stored in this block are invalid LBA write data and 80% of the data stored in this block are valid LBA write data.

When the controller 110 performs the garbage collection action, the controller 110 checks the valid data rates of all blocks in the non-volatile memory 120 sequentially and determines plural selected blocks according to the valid data rates. After the valid LBA write data in all of the selected blocks are moved to the blank blocks, all of the selected blocks are erased and the spaces for the invalid LBA write data are released successfully. Consequently, the programmable space of the non-volatile memory 120 is increased.

FIGS. 4A and 4B schematically illustrate the operations of the non-volatile memory of the conventional solid state drive when a garbage collection action is performed by the controller.

Please refer to FIG. 4A. After the controller 110 checks the valid data rates of all blocks in the non-volatile memory 120 sequentially, five selected blocks $B_{a1}$~$B_{a5}$ with the valid data rate of 80% are determined. After the valid LBA write data in all of the selected blocks $B_{a1}$~$B_{a5}$ are moved to the four new blank blocks $B_{b1}$~$B_{b4}$ by the controller 110, the five selected blocks $B_{a1}$~$B_{a5}$ are erased. Since the non-volatile memory 120 has one additional blank block, the programmable space of the non-volatile memory 120 is increased. Moreover, after the garbage collection action is completed, the program/erase count (P/E count) of each of the five selected blocks $B_{a1}$~$B_{a5}$ is added by 1.

Generally, when the controller 110 of the conventional solid state drive 10 performs the garbage collection action, the blocks with the lower valid data rate are determined as the selected blocks. After the valid LBA write data in all of the selected blocks are moved to the other blank blocks, these selected blocks are erased as the blank blocks and the garbage collection action is completed.

As mentioned above, the solid state drive 10 receives the LBA and the valid LBA write data according to the write command of the host 12 and stores the valid LBA write data into the non-volatile memory 120. Consequently, the solid state drive 10 is unable to realize the valid data rates of all blocks in the non-volatile memory 120. When the garbage collection action is performed, the controller 110 has to sequentially check the blocks in the non-volatile memory 120 in order to confirm their valid data rates. However, the non-volatile memory 120 has so many blocks. When the garbage collection action is performed, it takes a long time for the controller 110 to determine the selected blocks and move the valid LBA write data. In other words, the system latency of the solid state drive 10 is increased and the performance of the solid state drive 10 is impaired.

An inferior condition of the garbage collection action is shown in FIG. 4B. After the controller 110 checks the valid data rates of all blocks in the non-volatile memory 120 sequentially, 100 selected blocks $B_{a1}$~$B_{a100}$ with the valid data rate of 99% are determined. After the valid LBA write data in all of the 100 selected blocks $B_{a1}$~$B_{a100}$ are moved to the 99 new blank blocks $B_{b1}$~$B_{b99}$ by the controller 110, the 100 selected blocks $B_{a1}$~$B_{a100}$ are erased. Obviously, the time period of performing the above garbage collection action is very long. Since the solid state drive 10 has the maximum system latency, the system performance of the solid state drive 10 is largely reduced. Moreover, after the garbage collection action is completed, the P/E count of each of the 100 selected blocks $B_{a1}$~$B_{a100}$ is added by 1.

As mentioned above, the conventional solid state drive 10 is unable to realize the valid data rates of all blocks in the non-volatile memory 120. Consequently, during the garbage collection action of the conventional solid state drive 10, the system latency of the solid state drive 10 is very unstable and unexpected. Moreover, since the controller 110 determines the blocks with the lower valid data rate as the selected blocks, the P/E counts of the blocks in the non-volatile memory 120 are very uneven after the garbage collection action has been performed many times. That is, the P/E counts of some blocks in the non-volatile memory 120 are very high, and the P/E counts of some other blocks in the non-volatile memory 120 are very low.

Generally, the parameters influencing the use life of the solid state drive 10 are mainly the ambient temperature and the P/E counts. When the solid state drive 10 moves the valid LBA write data, the P/E counts are increased according to the amount of the valid LBA write data. The increase of the P/E count is referred as a write amplification index (WAI).

The lower WAI indicates that the amount of the moved valid LBA write data is lower and the P/E count of the block is lower. Consequently, the use life of the solid state drive 10 is extended. Whereas, the higher WAI indicates that the amount of the moved valid LBA write data is higher and the P/E count of the block is higher. Consequently, the use life of the solid state drive 10 is shortened. For example, the WAI corresponding to the garbage collection action of FIG. 4A is lower than the WAI corresponding to the garbage collection action of FIG. 4B.

SUMMARY OF THE INVENTION

The present invention provides a control method for a solid state drive in order to control the valid data rate and the write amplification index. Consequently, the use life of the solid state drive is extended.

An embodiment of the present invention provides a control method for a solid state drive. The solid state drive includes a non-volatile memory. The non-volatile memory includes plural blocks. The control method includes the following steps. In a step (a1), a block is opened. In a step (a2), a program action is performed to store a valid write data into the open block. Then, a step (a3) is performed to judge whether an amount of the valid write data in the open block reaches a predetermined capacity. In a step (a4), if the amount of the valid write data in the open block does not reach the predetermined capacity, the step (a2) is performed again. In a step (a5), if the amount of the valid write data in the open block reaches the predetermined capacity, the open block is closed and the step (a1) is performed again. The predetermined capacity is lower than a capacity of one block.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 4A (prior art) and 4B (prior art) schematically illustrate the operations of the non-volatile memory of the conventional solid state drive when a garbage collection action is performed by the controller;

DETAILED DESCRIPTION OF PREFERRED EMBODIMENTS

During the garbage collection action of the conventional solid state drive 10, the system latency of the solid state drive 10 is very unstable and unexpected. In the inferior condition of the garbage collection action, the system latency of the solid state drive 10 is very low, and the performance of the solid state drive 10 is largely reduced.

Figure 5:
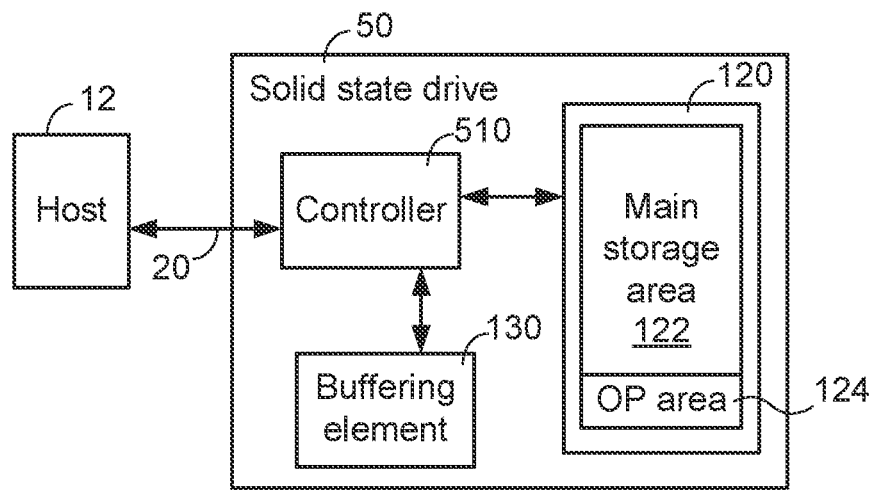
FIG. 5 is a schematic functional block diagram illustrating the architecture of a solid state drive according to an embodiment of the present invention.

FIG. 5 is a schematic functional block diagram illustrating the architecture of a solid state drive according to an embodiment of the present invention. As shown in FIG. 5, the solid state drive 50 comprises a controller 510, a buffering element 130 and a non-volatile memory 120. The controller 510 is in communication with a host 12 through an external bus 20. Consequently, commands and data can be exchanged between the controller 510 and the host 12. For example, the buffering element 130 is a cache memory, and the non-volatile memory 120 is a flash memory. For example, the buffering element 130 is a static random access memory (SRAM) or a dynamic random access memory (DRAM). For example, the external bus 20 is a USB bus, an IEEE 1394 bus, a M.2 bus, a PCIe bus or a SATA bus.

Figure 1:
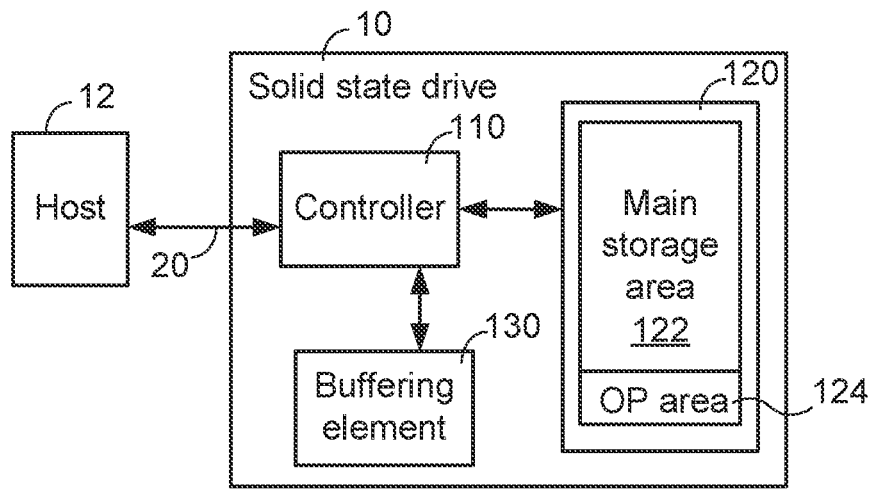
FIG. 1 (prior art) is a schematic functional block diagram illustrating the architecture of a conventional solid state drive.
Figure 2:
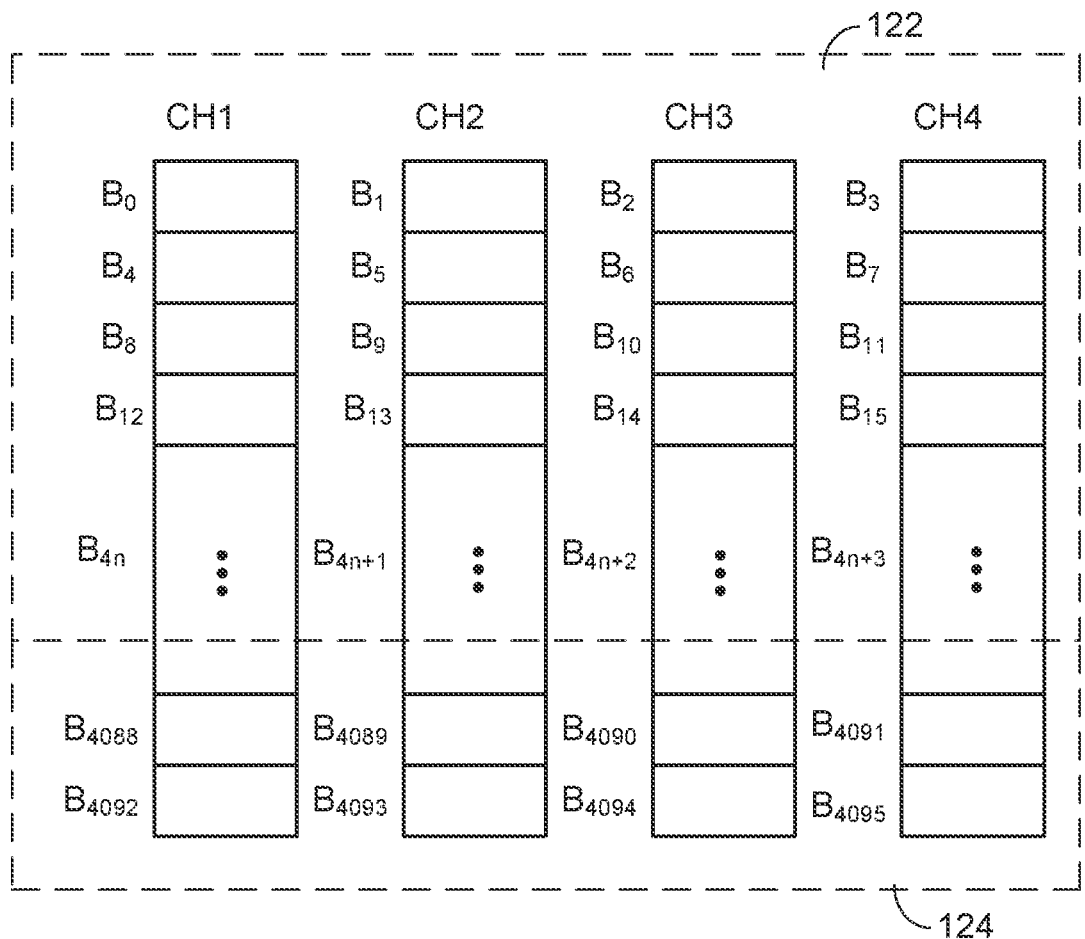
FIG. 2 (prior art) schematically illustrates the structure of a four-channel non-volatile memory.
Figure 3A:
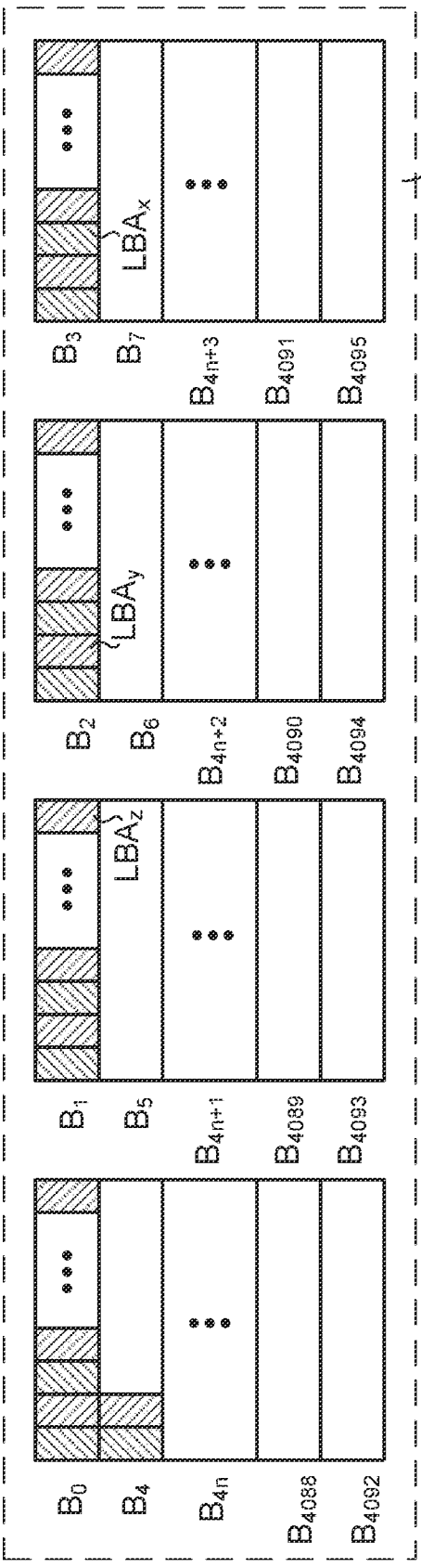
FIGS. 3A (prior art) to 3D (prior art) schematically illustrate the operations of the non-volatile memory of the conventional solid state drive when a program action is performed by the controller.
Figure 3B:
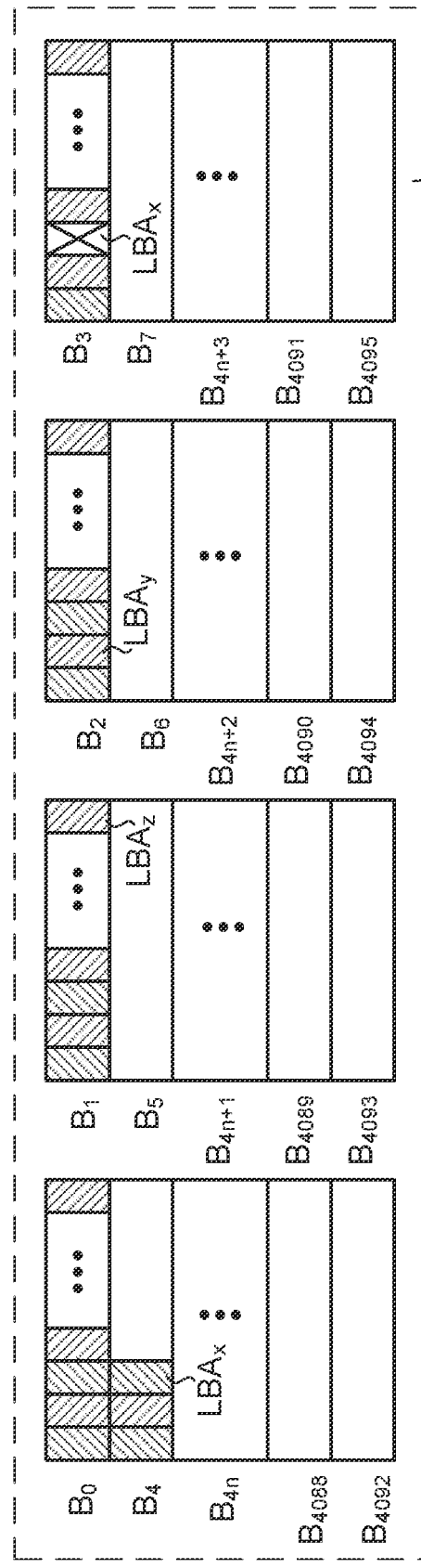
Figure 3C:
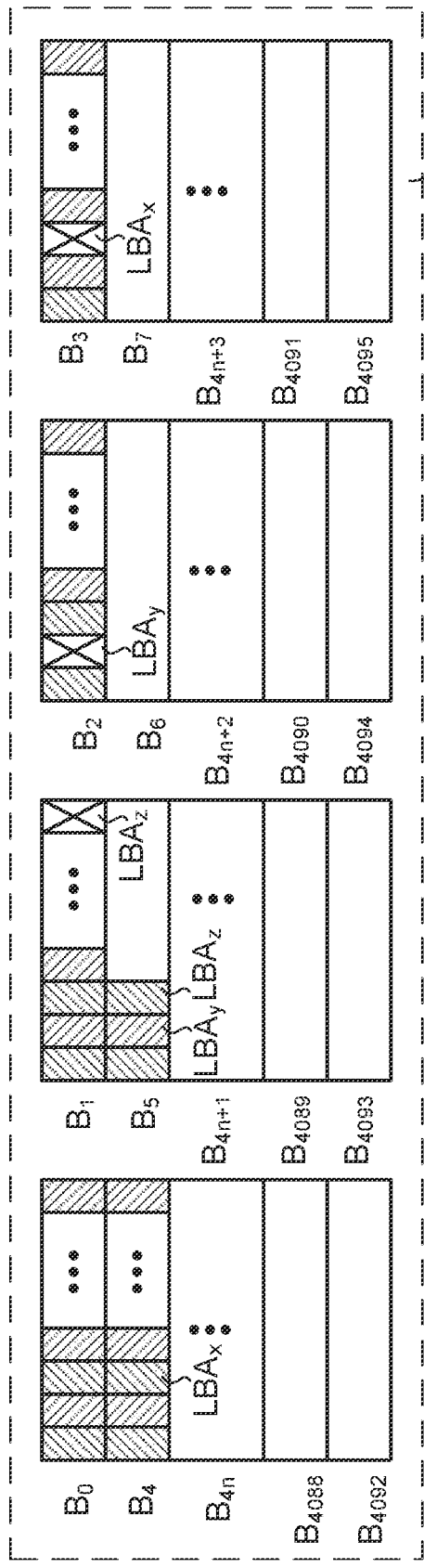
Figure 3D:
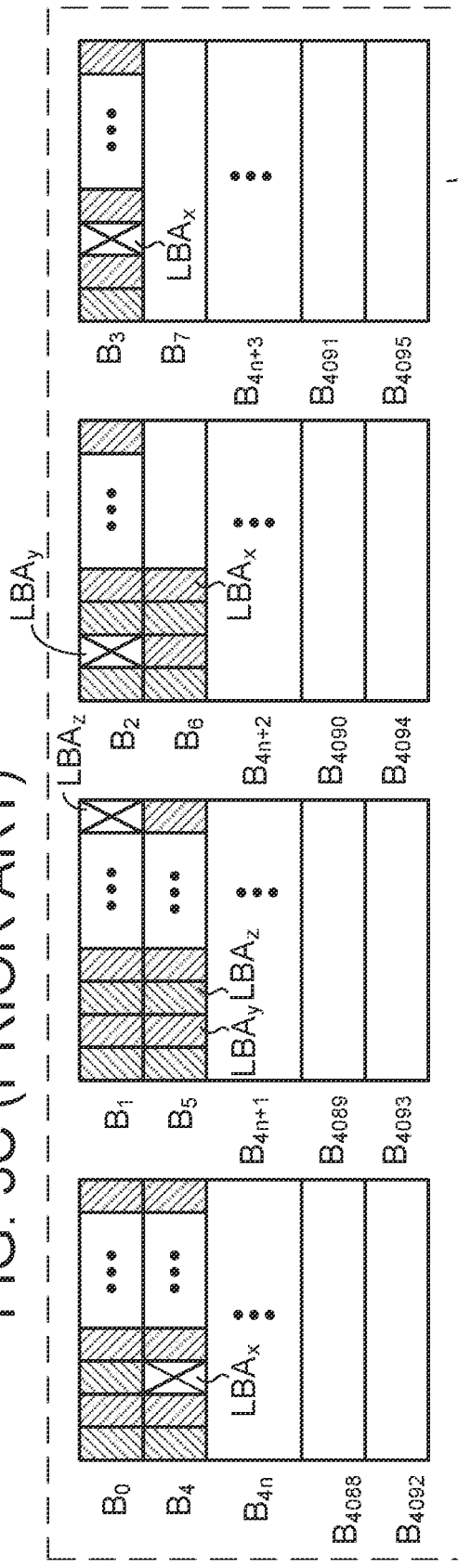

The non-volatile memory 120 comprises a main storage area 122 and an over-provisioning area (OP area) 124. The structure of the non-volatile memory 120 is similar to that as shown in FIG. 2, and is not redundantly described herein. Generally, the host 12 is only able to access the data of the main storage area 122. The data for the controller 510 to implement specified functions are stored in the OP area 124. For example, the total capacity of the non-volatile memory 120 is 512G bytes, the capacity of the non-volatile memory 120 is 480G bytes, and the capacity of the OP area 124 is 32G bytes. Consequently, the over-provisioning rate is about 7%, i.e., [(512−480)/480]=7%.

In an embodiment, the controller 510 of the solid state drive 50 can control the upper limit of the highest valid data rate of each block during the program action. Consequently, during the garbage collection action, the number of the selected blocks that is determined by the controller 510 is lower than a predetermined number. Since the system latency of the solid state drive 50 is controlled, the performance of the solid state drive 50 is not subjected to the large change. In some other embodiments, the controller 510 determines the upper limit of the valid data rate of each block according to the over-provisioning rate of the non-volatile memory 120.

Figure 6:
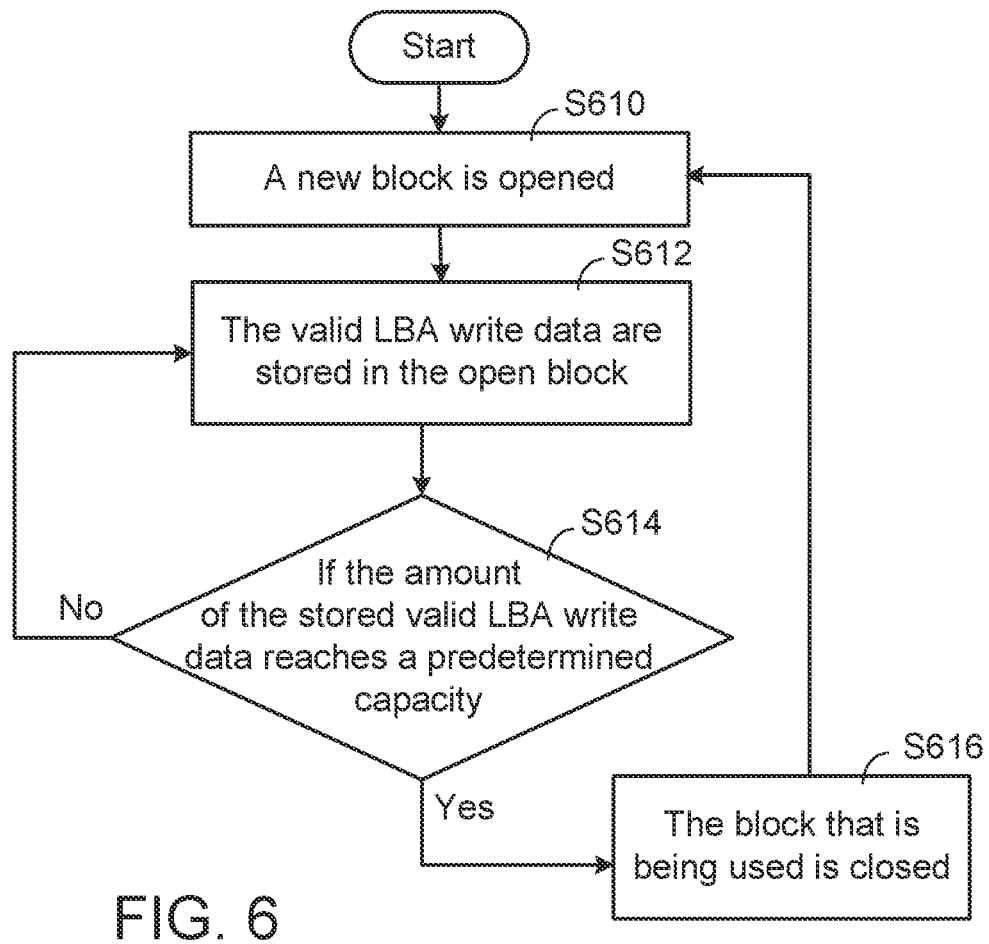
FIG. 6 is a flowchart illustrating a write control method for a non-volatile memory of the solid state drive according to an embodiment of the present invention.

FIG. 6 is a flowchart illustrating a write control method for a non-volatile memory of the solid state drive according to an embodiment of the present invention.

After the solid state drive 50 is enabled, the controller 510 opens a new block in the main storage area 122 of the non-volatile memory 120 (Step S610). When a program action is performed, the valid LBA write data are stored in the open block by the controller 510 (Step S612).

Then, a step S614 is performed to judge whether the amount of the stored valid LBA write data reaches a predetermined capacity. The predetermined capacity is smaller than the capacity of one block. For example, the predetermined capacity is 95% of the capacity of one block. If the judging result of the step S614 indicates that the amount of the stored valid LBA write data does not reach the predetermined capacity, the step S612 is repeatedly done to continuously store the valid LBA write data in the open block. Whereas, if the judging result of the step S614 indicates that the amount of the stored valid LBA write data reaches the predetermined capacity, the controller 510 closes the block that is being used (Step S610). Then, the step S610 is repeatedly done to open another new block.

As mentioned above, when program action of the conventional solid state drive is performed, the write data is firstly filled in the whole block and then the write data is stored into a new block. In accordance with the technology of the present invention, only a portion of the block is used to store the write data when the controller 510 performs the program action. That is, when the amount of the write data of the block reaches the predetermined capacity, the controller 510 closes the block that is being used. Then, another block is opened, and the similar procedure is performed to store the write data.

In an embodiment, the predetermined capacity is set as 90%~95% of the capacity of one block by the controller 510. That is, the upper limit of the valid data rate of each block is set as the 90%~95% of the capacity of one block. In another embodiment, the predetermined capacity is determined according to the over-provisioning rate of the non-volatile memory 120. For example, if the over-provisioning rate is 7%, the predetermined capacity is equal to (1−the over-provisioning rate)×the capacity of one block. That is, the predetermined capacity is 93% (i.e., 1−7%=93%) of the capacity of one block.

For example, the predetermined capacity is 95% of the capacity of one block. That is, the upper limit of the valid data rate of each block is 95%. If the host 12 has updated the stored LBA write data in the block in the subsequent program action, the valid data rate of the block is certainly lower than 95%.

Consequently, during the garbage collection action, the number of the selected blocks determined by the controller 510 is certainly lower than 20. Since the largest number of the selected blocks is confirmed, the controller 510 can move the valid LBA write data in the selected blocks to other blocks within the predictable system latency and erase the selected blocks as the blank blocks. Moreover, since the system latency of the solid state drive 50 is controlled, the system performance is not subjected to a large change.

Moreover, the upper limit of the valid data rate of the used block (i.e., the closed block) is 95%. During the garbage collection action, it is not necessary for the controller 510 to sequentially check the valid data rates of all blocks. Moreover, during the garbage collection action, the blocks with the consecutive serial numbers are determined as the selected blocks by the controller 510.

Figure 7:
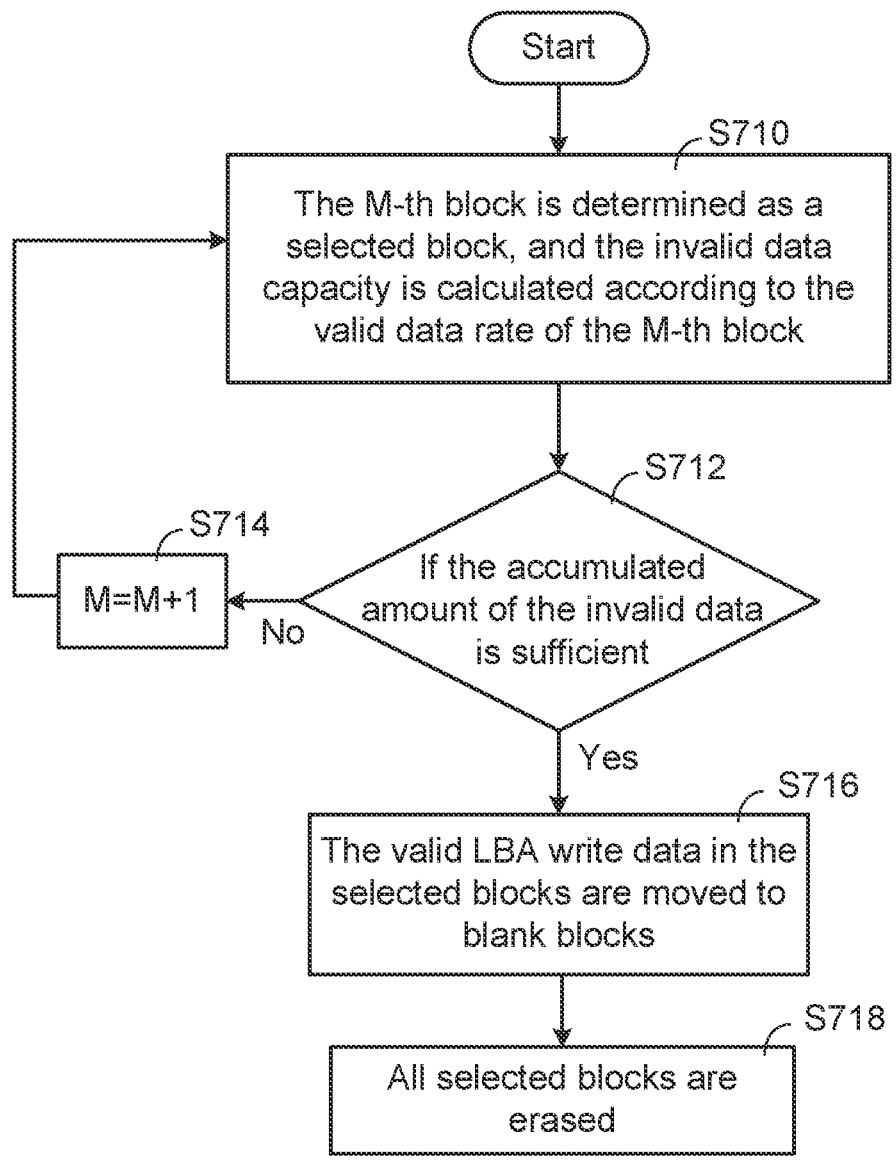
FIG. 7 is a flowchart illustrating a process of performing the garbage collection action in cooperation with the above write control method.

FIG. 7 is a flowchart illustrating a process of performing the garbage collection action in cooperation with the above write control method.

During the garbage collection action, the M-th block $B_M$ is determined as a selected block by the controller 510, and the invalid data capacity is calculated according to the valid data rate of the M-th block $B_M$ (Step S710), wherein M is an integer larger than or equal to 0. For example, if the valid data rate of the M-th block $B_M$ is 95%, the invalid data capacity of the M-th block $B_M$ is equal to 5% of the capacity of one block.

Then, a step S712 is performed to judge whether the accumulated amount of the invalid data is sufficient. If the accumulated amount of the invalid data is not sufficient, the controller 510 will not move the valid LBA write data in the selected block. Consequently, M is added by 1 (Step 714), and the step S710 is repeatedly done. Whereas, if the accumulated amount of the invalid data is sufficient, the controller 510 will move the valid LBA write data in the selected blocks to blank blocks (Step S716). After all selected blocks are erased by the controller 510 (Step S718), the garbage collection action is completed.

For example, when the garbage collection action is performed by the controller 510, the blocks $B_{100}$~$B_{110}$ (i.e., 11 consecutive blocks) are determined as the selected blocks according to the flowchart of FIG. 7. The invalid data capacities of these blocks are sequentially 5%, 7%, 10%, 5%, 8%, 5%, 9%, 20%, 5%, 6% and 10% of the capacity of one block. The accumulated amount of the invalid data in the eleven selected blocks (i.e., the blocks $B_{100}$~$B_{110}$) is sufficient. That is, the accumulated amount of the invalid data in the eleven selected blocks (i.e., the blocks $B_{100}$~$B_{110}$) is equal to or larger than the capacity of one block. Consequently, the valid LBA write data in the eleven selected blocks (i.e., the blocks $B_{100}$~$B_{110}$) are moved to ten blank blocks by the controller 510. After all selected blocks (i.e., the blocks $B_{100}$~$B_{110}$) are erased by the controller 510, the garbage collection action is completed. Moreover, when the controller 510 performs the garbage collection action again, plural consecutive blocks beginning from the block $B_{111}$ are determined as the selected blocks by the controller 510.

As mentioned above, in the garbage collection action of the conventional solid state drive 10, the controller 110 determines the blocks with the lower valid data rate as the selected blocks. After the garbage collection action has been performed many times, the P/E counts of the blocks in the non-volatile memory 120 are very uneven.

In accordance with the present invention, the garbage collection action of the solid state drive 50 cooperates with the write control method. During the garbage collection action, all blocks in the non-volatile memory 120 are sequentially determined as the selected blocks. After the garbage collection action has been performed many times, the P/E counts of all blocks in the non-volatile memory 120 are almost identical. Consequently, the use life of the solid state drive 50 is effectively extended.

Moreover, during the program action, the upper limit of the valid data rate of each block is controlled. During the garbage collection action, the maximum number of the selected blocks is determined. Consequently, the write amplification index (WAI) can be controlled stably, and the use life of the solid state drive is extended.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for a solid state drive, the solid state drive comprising a non-volatile memory, the non-volatile memory including a main storage area with a main storage area capacity and an over-provisioning area with an over-provisioning area capacity, the main storage area is different from the over-provisioning area, an over-provisioning rate is determined according to the ratio of the over-provisioning area capacity to the main storage area capacity, a host is only able to access the data of the main storage area and the over-provisioning area is used to store the data for a controller to implement specified functions, the main storage area comprising plural blocks, the control method comprising steps of:
- (a1) opening a block to be an open block;
- (a2) performing a program action to store a valid write data into the open block;
- (a3) judging whether an amount of the valid write data in the open block reaches a predetermined capacity;
- (a4) in response to the amount of the valid write data in the open block not reaching the predetermined capacity, performing the steps (a2) to (a3) again; and
- (a5) in response to the amount of the valid write data in the open block reaching the predetermined capacity, closing the open block to be a closed block and performing the step (a1) again, wherein no more program action is performed to the closed block and the predetermined capacity is lower than a capacity of one block; and wherein the predetermined capacity is equal to a product of (1- the over-provisioning rate) and the capacity of one block.

2. The control method as claimed in claim 1, wherein the predetermined capacity is set as 90%-95% of the capacity of one block.

3. The control method as claimed in claim 1, further comprising steps of:
- (b1) performing a garbage collection action;
- (b2) determining a M-th block as a selected block, and calculating an invalid data capacity according to a valid data rate of the M-th block;
- (b3) judging whether the invalid data capacity of the selected block is sufficient;
- (b4) in response to the invalid data capacity being not sufficient, adding 1 to M, and performing the steps (b2) to (b3) again;
- (b5) in response to an accumulated invalid data capacity being sufficient, moving the valid write data of the one or more selected blocks to at least one blank block, wherein the accumulated invalid data capacity is the accumulation of the invalid data capacity of the one or more selected blocks; and
- (b6) erasing all of the selected blocks.

4. The control method as claimed in claim 3, wherein the valid write data is valid logical block addresses (LBA) write data.

\* \* \* \* \*